United States Patent
Seong et al.

(10) Patent No.: US 10,062,908 B2
(45) Date of Patent: Aug. 28, 2018

(54) SOLID OXIDE FUEL CELL COMPRISING REACTION PREVENTING LAYER AND METHOD FOR MANUFACTURING SAME

(71) Applicant: POSCO, Gyeongsangbuk-do (KR)

(72) Inventors: Byeong-Geun Seong, Kyungsangbook-do (KR); Hong-Youl Bae, Kyungsangbook-do (KR)

(73) Assignee: POSCO, Gyeongsangbuk-DO (KR)

( * ) Notice: Subject to any disclaimer, the term of this patent is extended or adjusted under 35 U.S.C. 154(b) by 57 days.

(21) Appl. No.: 15/299,575

(22) Filed: Oct. 21, 2016

(65) Prior Publication Data
US 2017/0040618 A1 Feb. 9, 2017

Related U.S. Application Data

(62) Division of application No. 14/363,417, filed as application No. PCT/KR2011/009511 on Dec. 9, 2011.

(51) Int. Cl.
| | |
|---|---|
| *H01M 4/02* | (2006.01) |
| *H01M 4/86* | (2006.01) |
| *H01M 8/1213* | (2016.01) |
| *H01M 8/1253* | (2016.01) |
| *H01M 4/90* | (2006.01) |
| *B05D 1/02* | (2006.01) |
| *H01M 4/88* | (2006.01) |
| *H01M 8/1246* | (2016.01) |
| *H01M 8/124* | (2016.01) |

(52) U.S. Cl.
CPC ............ *H01M 4/8663* (2013.01); *B05D 1/02* (2013.01); *H01M 4/88* (2013.01); *H01M 4/9033* (2013.01); *H01M 8/1213* (2013.01); *H01M 8/1246* (2013.01); *H01M 8/1253* (2013.01); *H01M 4/8885* (2013.01); *H01M 2008/1293* (2013.01); *Y02E 60/525* (2013.01); *Y02P 70/56* (2015.11)

(58) Field of Classification Search
CPC .... H01M 4/8663; H01M 4/88; H01M 4/9033; H01M 4/8885; H01M 8/1246; H01M 8/1213; H01M 8/1253
See application file for complete search history.

(56) References Cited

U.S. PATENT DOCUMENTS

| | | | |
|---|---|---|---|
| 2006/0234100 A1* | 10/2006 | Day ................... | B01D 67/0041 |
| | | | 429/465 |
| 2007/0009784 A1 | 1/2007 | Pal et al. | |
| 2007/0148521 A1 | 6/2007 | Ukai et al. | |
| 2009/0148743 A1 | 6/2009 | Day et al. | |
| 2009/0191431 A1* | 7/2009 | Washima ................ | B01J 23/42 |
| | | | 429/482 |
| 2011/0143038 A1 | 6/2011 | Bone et al. | |
| 2011/0195343 A1 | 8/2011 | Watts et al. | |
| 2011/0200910 A1 | 8/2011 | Wachsman et al. | |
| 2011/0305973 A1 | 12/2011 | Kobayashi et al. | |

* cited by examiner

*Primary Examiner* — Jimmy Vo
(74) *Attorney, Agent, or Firm* — Cantor Colburn LLP

(57) ABSTRACT

The present invention relates to a solid oxide fuel cell which can improve the overall performance of the cell and obtain durability and reliability, and the invention provides a solid oxide fuel cell comprising a reaction preventing layer and a method for manufacturing the same, wherein an anode, an electrolyte, and a cathode are comprised, and a material which is formed between the electrolyte and the cathode comprises 35-90 mol % of gadolinia-doped ceria (GDC) and 10-65 mol % of metal oxide.

3 Claims, 3 Drawing Sheets

SOLID OXIDE FUEL CELL COMPRISING REACTION PREVENTING LAYER AND METHOD FOR MANUFACTURING SAME

This is a division of application Ser. No. 14/363,417, § 371(c) date of Jun. 6, 2014, which is the National Stage of PCT/KR2011/009511, filed Dec. 9, 2011, which is incorporated herein by reference.

TECHNICAL FIELD

The present disclosure relates to a solid oxide fuel cell (SOFC), and more particularly, to a solid oxide fuel cell including a reaction preventing layer.

BACKGROUND ART

A fuel cell is a device producing electricity through a reaction between oxygen and a fuel such as hydrogen, natural gas or the like. Fuel cells are characterized by high efficiency, non-polluting and noise-free characteristics, and the like, which are thus regarded as future energy technology.

Solid oxide fuel cells (SOFC) may utilize a solid oxide as an electrolyte allowing oxygen ions to pass therethrough, and zirconium oxide ($ZrO_2$), cerium oxide ($CeO_2$), lanthanum strontium gadolinium magnesium (LSGM) or the like may be used as the electrolyte material.

The electrolyte may contain a stabilizer such as yttria ($Y_2O_3$) ceria ($CeO_2$), scandia ($Sc_2O_3$), gadolinia ($Gd_2O_3$) or the like in order to improve ionic conductivity and thermal stability at high temperatures.

A unit cell of the SOFC may be manufactured by arranging the solid electrolyte to have one side attached to an anode material and the other side attached to a cathode material. A mixture of a nickel oxide (NiO) and yttria stabilized zirconia (YSZ) is commonly used as an anode material, and lanthanum strontium manganite (LSM), lanthanum strontium cobalt ferrite (LSCF) or the like is commonly used as a cathode material.

In recent years, it has been found that the electrochemical properties of fuel cells can be improved by using LSCF as the cathode material, rather than LSM. Accordingly, the development and evaluation of LSCF as the cathode material has been actively promoted.

However, such an LSCF cathode material may react with the zirconia-based ($ZrO_2$) electrolyte material, thereby forming a composite oxide having low ionic conductivity, such as lanthanum zirconate ($La_2Zr_2O_7$) or strontium zirconate ($SrZrO_3$), on an interface between the cathode and the electrolyte while the cathode is sintered and the fuel cell is operated at high temperatures.

Such a compound may decrease a diffusion rate of oxygen ions formed at cathode through the electrolyte to react with hydrogen in the anode, thereby degrading the overall performance of the fuel cell.

Therefore, in order to obtain durability and reliability of the fuel cell, it is necessary to prevent a reaction between two layers, one of which is formed of LSCF as the cathode material and the other one is formed of a zirconia-based ($ZrO_2$) material as the electrolyte material.

DISCLOSURE

Technical Problem

An aspect of the present disclosure provides a solid oxide fuel cell (SOFC) including a reaction preventing layer between a cathode and an electrolyte and a method of manufacturing the same, in order to improve the overall performance of the fuel cell and obtain durability and reliability thereof.

Technical Solution

According to an aspect of the present disclosure, there is provided a solid oxide fuel cell including an anode, an electrolyte, a cathode, and a reaction preventing layer disposed between the electrolyte and the cathode and formed of a material including 35 mol % to 90 mol % of gadolinia cloned ceria (GDC) and 10 mol % to 65 mol % of a metal oxide.

According to another aspect of the present disclosure, there is provided a method of manufacturing a solid oxide fuel cell including a reaction preventing layer, the method including: forming an anode layer; forming a solid oxide electrolyte layer on the anode layer; forming a reaction preventing layer on the electrolyte layer by depositing a material including 35 mol % to 90 mol % of gadolinia doped ceria (GPO) and 10 mol % to 65 mol % of a metal oxide through an aerosol deposition method (ADM); and forming a cathode layer on the reaction preventing layer.

Advantageous Effects

A solid oxide fuel cell (SOFC) according to exemplary embodiments of the present disclosure may include a reaction preventing layer to prevent the elements constituting a cathode material from diffusing into an electrolyte layer during sintering a cathode layer. In addition, even when the fuel cell is operated at high temperatures for an extended period of time, the reaction preventing layer may be stable to thereby improve high-temperature reliability of the fuel cell.

BEST MODE

Hereinafter, embodiments of the present disclosure will be described in detail with reference to the accompanying drawings.

Figure 1:
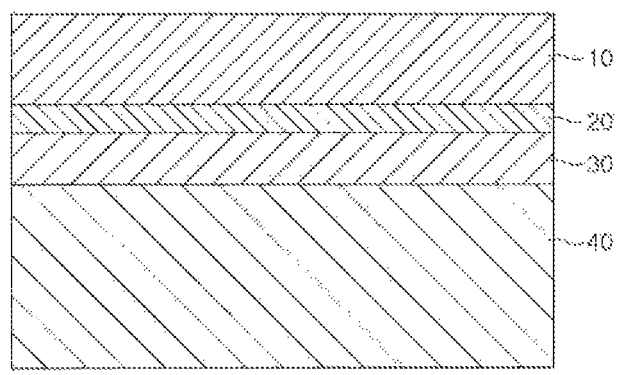
FIG. 1 is a schematic cross-sectional view illustrating a solid oxide fuel cell (SOFC) according to an exemplary embodiment of the present disclosure.

With reference to FIG. 1, a solid oxide fuel cell according to an exemplary embodiment of the present disclosure will be described in detail. FIG. 1 illustrates an aspect of the solid oxide fuel cell in order to help in an understanding of the present inventive concept.

The solid oxide fuel cell according to the exemplary embodiment of the present disclosure may include a cathode 10, an electrolyte 30 and an anode 40, and a reaction preventing layer 20 may be formed between the electrolyte 30 and the cathode 10. In general, the solid oxide fuel cell has a structure in which the electrolyte 30 is disposed in the middle and the cathode 10 and the anode 40 are disposed on both sides of the electrolyte 30.

In the cathode 10 of the fuel cell, oxygen is combined with electrons to form oxygen ions passing through the electrolyte 30. In the anode 40 of the fuel cell, the oxygen ions are separated from the electrons and react with hydrogen gas to produce water vapor.

The electrolyte 30 of the solid oxide fuel cell is so dense that no gas passes therethrough. The electrolyte 30 should have low electronic conductivity, with conductivity for oxygen ions remaining high. The anode and the cathode should be porous to allow gases to diffuse thereinto and should have high electronic and ionic conductivity.

A material for the cathode 10 of the solid oxide fuel cell according to the exemplary embodiment of the present disclosure may include lanthanum strontium manganite (LSM), lanthanum strontium cobalt (LSC), lanthanum strontium cobalt ferrite (LSCF) or the like. Preferably, LSCF and/or LSC may be used. In addition, LSCF may be used for the anode 10 alone, or it may be combined with a zirconium-based or cerium-based oxide.

The electrolyte 30 according to the exemplary embodiment of the present disclosure may be formed of a solid oxide, and zirconia ($ZrO_2$), lanthanum strontium gadolinium magnesium (LSGM) or the like may be used.

The anode 40 according to the exemplary embodiment of the present disclosure may include a mixture of nickel oxide (Nb) and yttria stabilized zirconia (YSZ).

The reaction preventing layer 20 may serve to prevent LSCP of the cathode 10 from reacting with zirconia ($ZrO_2$) of the electrolyte 30.

More specifically, while the cathode 10 is sintered in the process of manufacturing the solid oxide fuel cell or the solid oxide fuel cell is operated at high temperatures, the reaction preventing layer 20 may prevent the production of a composite oxide having low ionic conductivity and low electrical conductivity such as lanthanum zirconate ($La_2Zr_2O_7$) or strontium zirconate ($SrZrO_3$) on an interface between the cathode and the electrolyte at the time of a reaction between LSCF of the cathode 10 and zirconia ($ZrO_2$) of the electrolyte 30.

The production of the compound such as lanthanum zirconate ($La_2Zr_2O_7$) or strontium zirconate ($SrZrO_3$) may decrease a diffusion rate of oxygen ions formed at cathode 10 through the electrolyte 30 to react with hydrogen in the anode 40, thereby degrading the overall performance of the fuel cell.

The reaction preventing layer 20 should not chemically react with the components constituting the cathode 10. In particular, lanthanum (La), strontium (Sr) and the like, in any state such as a solid atomic state or a gaseous state, of the components constituting the cathode 10 able to react with the electrolyte 30 should not be allowed to pass through the reaction preventing layer 20 and diffuse into the electrolyte 30. In addition, the material of the reaction preventing layer 20 should have high oxygen ion conductivity to allow the oxygen ions formed in the cathode 10 to diffuse into the electrolyte 30 and reach the anode 40. For this reason, gadolinia doped ceria (GDC) is commonly used.

However, in the case of using GDC, it is not easy to form the reaction preventing layer 20 using an aerosol deposition method (ADM). That is, in the case of coating the electrolyte with pure GDC, there may be difficulties in forming such a coating layer to have a desired thickness in industrial use due to a low deposition speed. According to the exemplary embodiment of the present disclosure, in order to facilitate the deposition of the reaction preventing layer 20 using the ADM, the reaction preventing layer 20 may be formed of a metal oxide that is well capable of being deposited through the ADM with GDC. The metal oxide may increase the deposition speed during the deposition of the GDC powder mixed therewith to form the coating layer. Accordingly, the metal oxide used together with the GDC in the forming of the coating layer may increase the deposition speed to address the aforementioned coating problem using the pure GDC.

The reaction preventing layer may include 35 mol % to 90 mol % of GDC and 10 mol % to 65 mol % of the metal oxide. In a case in which the metal oxide exceeds 65 mol %, the oxygen ion conductivity may decrease, whereby the output of the fuel cell may be lowered as compared with a coating layer in which ceria and gadolinia are mixed. In order to obtain the effect of improving the deposition speed using a mixture of the metal oxide and GDC, the metal oxide may be contained in an amount of at least 10 mol %.

Meanwhile, any metal oxide may be used so long as it can be well deposited as compared to GDC. Examples of the metal oxide may include alumina ($Al_2O_3$), ceria ($CeO_2$), gadolinia ($Gd_2O_3$) yttria ($Y_2O_3$) zirconia ($ZrO_2$) and the like. Alternatively, a metal oxide doped (alloyed) with another component, rather than a pure metal oxide, may be used.

Meanwhile, the reaction preventing layer 20 may be formed to have no pores. However, pores may be partially formed therein according to processing conditions. In this case, the pore size may be 0.1 μm or below. In the case in which the pore size is 0.1 μm or below, there is no connection between the material of the cathode 10 and the material of the electrolyte 30, resulting in no effect on the performance of the fuel cell. On the other hand, in the case in which the reaction preventing layer 20 has pores exceeding a size of 0.1 μm, the material of the cathode 10 may react with the material of the electrolyte 30 on an interface between the reaction preventing layer 20 and the electrolyte 30 by the diffusion of cathode elements like Sr or La through the pores in the reaction preventing layer 20. Therefore, the reaction preventing layer 20 may have a dense structure in which the pore size is 0.1 μm or below.

In addition, a thickness of the reaction preventing layer 20 may range from 0.1 μm to 2 μm. In the case in which the thickness of the reaction preventing layer 20 is less than 0.1 μm, it may be difficult to form the whole membrane, and during the forming of the membrane, the thickness of the membrane may become non-uniform, whereby a reaction between the cathode 10 and the electrolyte 30 may partially occur. Meanwhile, in a case in which the thickness of the reaction preventing layer 20 exceeds 0.1 μm, the reaction between the electrolyte 30 and the cathode may be effectively prevented. However, the reaction preventing layer 20 itself may act as resistance. Therefore, the thickness of the reaction preventing layer 20 may not exceed 2 μm.

Hereinafter, a method of manufacturing a solid oxide fuel cell according to an exemplary embodiment of the present disclosure will be described in detail.

The manufacturing method according to this exemplary embodiment may include forming an anode layer, forming a solid oxide electrolyte layer on the anode layer; forming a reaction preventing layer on the electrolyte layer by using a material including 35 mol % to 90 mol % of gadolinium doped ceria (GDC) and 10 mol % to 65 mol % of a metal oxide through an aerosol deposition method (ADM); and forming a cathode layer on the reaction preventing layer.

A method of forming the anode layer and the electrolyte layer is not particularly limited, and a method known in the art to which the present inventive concept pertains may be used. For example, a tape casting method may be used.

That is, the anode layer may be formed of a mixture of nickel oxide (NiO) and zirconia ($ZrO_2$) through tape casting or the like, and the electrolyte layer may be formed of yttria stabilized zirconia (YSZ) through tape casting or the like.

After the anode layer and the electrolyte layer are formed, a sintering heat treatment may be performed.

Meanwhile, the reaction preventing layer 20 may be formed on the electrolyte layer by using a mixed powder of GDC and 1 wt % to 20 wt % of a metal oxide together with carrier gas through the ADM. The metal oxide may serve to improve the deposition speed of the reaction preventing layer. In the case in which the amount of the metal oxide is less than 1 wt %, it is difficult to obtain the effect of improving the deposition speed. In the case in which the amount of the metal oxide exceeds 20 wt %, GDC fraction ratio may be lowered, resulting in deterioration in the output of the fuel cell.

The reaction preventing layer formed of the mixed powder through the ADM may include 10 mol % to 65 mol % of the metal oxide in addition to the GDC.

The reaction preventing layer 20 may be formed by using a screen printing method, a sputtering method, or the like. However, the screen printing method may not allow the reaction preventing layer to have a dense structure. Accordingly, in the case in which the reaction preventing layer is formed using the screen printing method, while the cathode layer is formed thereon and is sintered, strontium (Sr), lanthanum (La) or the like of the elements constituting the cathode material may diffuse into the electrolyte layer through the pores formed in the reaction preventing layer, whereby a reaction layer having low ionic conductivity may be formed.

Meanwhile, the sputtering method may suffer from low membrane formation speed. Furthermore, since the sputtering method is performed within a chamber in which a high vacuum state is maintained, there may be a problem in terms of mass production in a case in which an area of the fuel cell is increased, resulting in low practicability.

Therefore, the reaction preventing layer 20 may be formed by the ADM.

The ADM is a method of forming a membrane by causing particles of powder used as a starting material to be ejected through a nozzle at high speed and impact a substrate.

The ADM is performed at room temperature to form a membrane having a dense structure, and an interfacial reaction between the substrate and the membrane does not occur during deposition of the membrane. Here, any substrate formed of various materials such as an oxide ceramic material, a polymer, a metal and the like may be used.

In addition, there is no change in composition between the powder and the deposited membrane, and thus, membrane formed of a compound having a complex composition may be easily produced.

The method of manufacturing a solid oxide fuel cell according to the exemplary embodiment of the present disclosure may further include heating the cathode layer at 950° C. to 1100° C. In the case in which the cathode 10 is formed of LSCF, while such a heat treatment is performed at a heating temperature lower than 950° C. which is not sufficiently high, adhesive strength between the cathode and the reaction preventing layer 20 may result in deterioration in the output of the fuel cell. In the case in which the heating temperature is higher than 1100° C., mutual diffusion between the electrolyte 30 and the cathode 10 may occur and electrical resistance therebetween may increase, and pores (holes) may be formed in portions of the reaction preventing layer 20, whereby a reaction between the cathode 10 and the electrolyte 30 may cause deterioration in the output of the fuel cell.

As a material for the reaction preventing layer 20, the material including 10 mol % to 65 mol % of the metal oxide in addition to GDC may be used as described above.

The formation of the reaction preventing layer 20 using the ADM may be performed by allowing the carrier gas to cause a powder including 1 wt % to 20 wt % of the metal oxide in addition to the GDC to impact a surface of the electrolyte layer at a speed of 100 m/sec to 500 m/sec. Here, air, nitrogen, helium or the like may be used as the carrier gas.

Here, an average particle size f the powder may range from 0.3 μm to 5 μm. In a case in which the average particle size of the powder is less than 0.3 μm, kinetic energy generated when the powder particles impact the substrate is so low that it may be difficult to form a membrane having a dense structure. In a case in which the average particle size of the powder exceeds 5 μm the particle size is so large that it may be difficult to form an aerosol, whereby a deposition speed may be lowered and uniformity of the membrane may deteriorate.

Hereinafter, specific examples of the present inventive concept will be described in detail. These examples are provided to help in an understanding of the present inventive concept and should not be construed as being limited thereto.

Inventive Example 1

Inventive Example 1 is intended to check a deposition speed in forming a reaction preventing layer.

First of all, a mixture of nickel oxide (NiO) and zirconia ($Zr_2O_3$) at a ratio of 50:50 was used to form an anode layer through tape casting, and yttria stabilized zirconia (YSZ) was used to form an electrolyte layer on the anode through tape casting. Then, the anode layer and the electrolyte layer were sintered.

After sintering, a material for a reaction preventing layer was prepared as described in table 1 and was used to form the reaction preventing layer on the electrolyte layer through the ADM. A system for aerosol deposition includes an aerosol chamber and a deposition chamber in which a deposition process is performed. The degree of a vacuum in the deposition chamber was lowered using a vacuum pump, and a mixture (in an aerosol state) of a powder formed in the aerosol chamber and carrier gas was ejected through a nozzle to cause a collision within the deposition chamber, thereby forming a membrane on a surface of the electrolyte layer.

Here, the membrane formation was performed under the following conditions: the same nozzle was used; compressed air was used as the carrier gas; a distance between the nozzle and a test sample was 10 mm; a movement rate of the test sample was set to be 10 mm/sec; and the test sample reciprocated with respect to the nozzle five times. Here, a manufacturing time was the same for each test sample.

The thickness of each reaction preventing layer formed through the aforementioned process was measured using a scanning electron microscope, and is illustrated in table 1 below.

TABLE 1

| | Components of Reaction Preventing Layer | Thickness of Reaction Preventing Layer (μm) |
|---|---|---|
| Comparative Example 1-1 | GDC | 0.2 |
| Inventive Example 1-1 | GDC + 1 wt % of Gadolinia | 0.5 |
| Inventive Example 1-2 | GDC + 2 wt % of Gadolinia | 1.2 |
| Inventive Example 1-3 | GDC + 10 wt % of Gadolinia | 1.5 |
| Inventive Example 1-4 | GDC + 20 wt % of Gadolinia | 1.8 |

As shown in table 1, a deposition speed in the case of using a pure GDC powder (comparative example 1-1) was much lower than that in the case of using the mixed powder (inventive examples 1-1 to 1-4) under the same conditions.

Inventive Example 2

After the anode layer and the electrolyte layer were formed in the same manner as that of inventive example 1, the reaction preventing layer was formed under different conditions as shown in table 2 below. The reaction preventing layer was formed to have a thickness of 0.6 μm to 1.0 μm by adjusting the number of reciprocating motions of the test samples with respect to the nozzle, that is, the number of depositions.

Thereafter, an anode layer was formed by screen-printing a mixture of LSCF and gadolinium doped ceria (Gd-doped $CeO_2$) on the reaction preventing layer, and was then sintered to manufacture a unit cell of a solid oxide fuel cell.

In order to evaluate electrochemical properties of the unit cell, the unit cell was cut into a button cell having a diameter of 23 mm and current-voltage output characteristics of the button cell were evaluated using a performance tester. At the time of evaluating the fuel cell, an amount of hydrogen supplied to the anode was 100 ml/min and an amount of air supplied to the cathode was 300 ml/min. The performance evaluation was made at a cathode temperature of 750° C. The measured characteristics are illustrated in table 2 and FIGS. 2 and 3.

TABLE 2

| | Components of Powder for Reaction Preventing Layer | Gadolinia mol % in Reaction Preventing Layer | Maximum Output Density (W/cm$^2$) |
|---|---|---|---|
| Comparative Example 2-1 | Pure Ceria | 0 | 0.68 |
| Comparative Example 2-2 | Mixed Powder of Ceria and 20 mol % of Gadolinia | 20 | 1.35 |
| Comparative Example 2-3 | Pure GDC | 0 | 1.78 |
| Inventive Example 2-1 | GDC + 1 wt % of Gadolinia | 12 | 1.74 |
| Inventive Example 2-2 | GDC + 2 wt % of Gadolinia | 20 | 1.66 |
| Inventive Example 2-3 | GDC + 10 wt % of Gadolinia | 29 | 1.56 |
| Inventive Example 2-4 | GDC + 20 wt % of Gadolinia | 63 | 1.41 |

Figure 2:
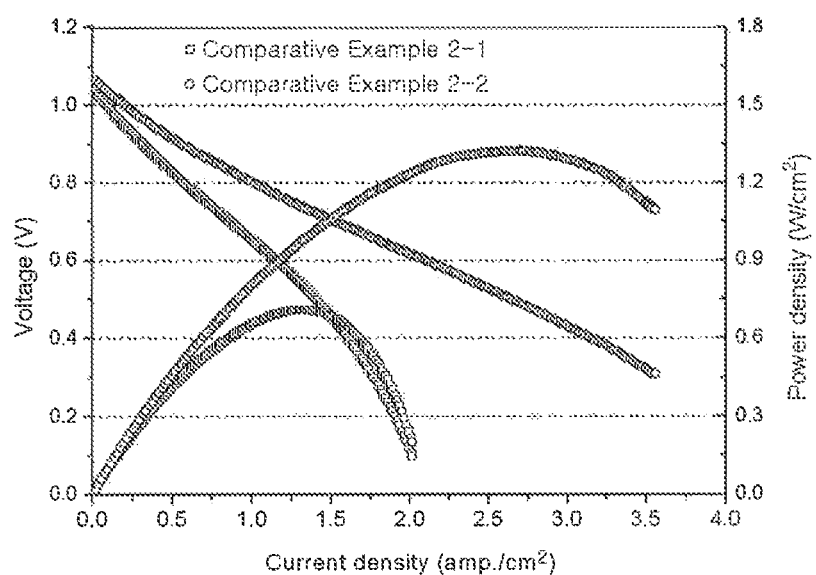
FIG. 2 is a graph illustrating evaluation results of output characteristics in comparative examples 2-1 and 2-2.
Figure 3:
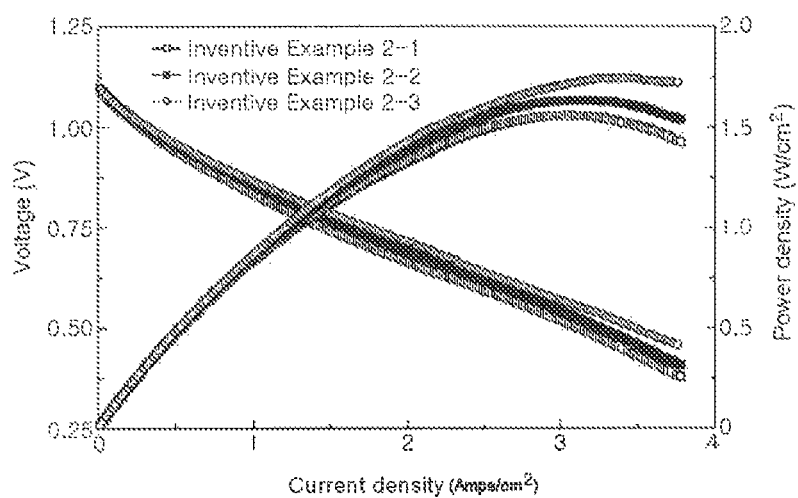
FIG. 3 is a graph illustrating evaluation results of output characteristics in inventive examples 2-1 to 2-3.

As can be seen in table 2 and FIGS. 2 and 3, in the case in which the reaction preventing layer was formed of pure ceria (comparative example 2-1) and a mixture of ceria and gadolinia (comparative example 2-2), the maximum output density was 0.68 W/cm$^2$ and 1.35 W/cm$^2$, respectively. However, it can be seen that the inventive examples exhibited superior output characteristics.

Meanwhile, it can be seen that in the case of using pure GDC (comparative example 2-3), the fuel cell secured superior performance by exhibiting the maximum output density of 1.78 w/cm$^2$. On the other hand, the maximum output densities of the inventive examples were slightly lower than the maximum output density of comparative example 2-3. However, in a case in which electricity is generated through an SOFC system in which several unit cells are stacked, the SOFC system usually operates at 200 mA/cm$^2$ to 500 mA/cm$^2$ and such a maximum output density difference is merely at the level of several percent. As described above with reference to inventive example 1, in the case of using the pure GDC, the deposition speed in forming the reaction preventing layer was significantly slow. In consideration of manufacturing yields with regard to the process of forming the reaction preventing layer, the use of the pure GDC is not preferable, so this case is classified as the comparative example.

Figure 4:
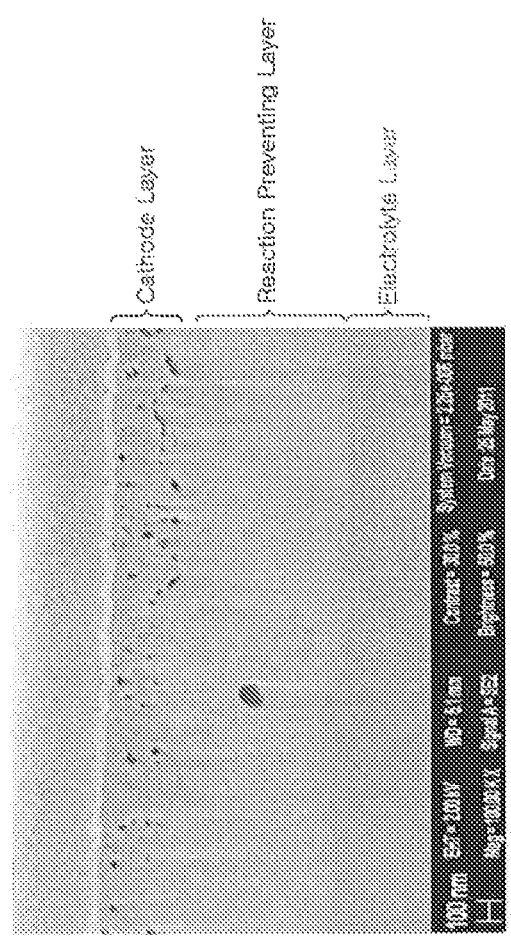
FIG. 4 is an electron microscope image of a cross-section of a unit cell of inventive example 2-1.

Meanwhile, FIG. 4 is an electron microscope image of a cross-section of the unit cell according to inventive example 2-1. As can be seen in FIG. 4, the reaction preventing layer was densely formed between the electrolyte and the cathode.

The invention claimed is:

1. A method of manufacturing a solid oxide fuel cell including a reaction preventing layer, the method comprising:
    forming an anode layer;
    forming a solid oxide electrolyte layer on the anode layer;
    forming the reaction preventing layer on the electrolyte layer by depositing a material including 35 mol % to 90 mol % of gadolinia doped ceria (GDC) and 10 mol % to 65 mol % of a metal oxide through an aerosol deposition method (ADM);
    forming a cathode layer on the reaction preventing layer; and
    heating the cathode layer at 950° C. to 1100° C.,
    wherein the reaction preventing layer has pores with a size no larger than 0.1 μm,
    wherein the forming of the reaction preventing layer through the ADM is performed by allowing carrier gas to cause a mixed powder including 1 wt % to 20 wt % of the metal oxide in addition to the GDC to impact a surface of the electrolyte layer at a speed of 100 m/sec to 500 m/sec, and
    wherein an average particle size of the mixed powder ranges from 0.3 μm to 5 μm.

2. The method of claim 1, wherein the metal oxide is selected from the group consisting of alumina ($Al_2O_3$), ceria ($CeO_2$), gadolinia ($Gd_2O_3$), yttria ($Y_2O_3$), and zirconia ($ZrO_2$).

3. The method of claim 1, wherein the reaction preventing layer is formed to have a thickness of 0.1 μm to 2 μm.

* * * * *